Sept. 12, 1939.   C. M. BLACKBURN   2,172,604
ELECTROLYTIC CONDENSER TERMINAL
Filed Nov. 1, 1937
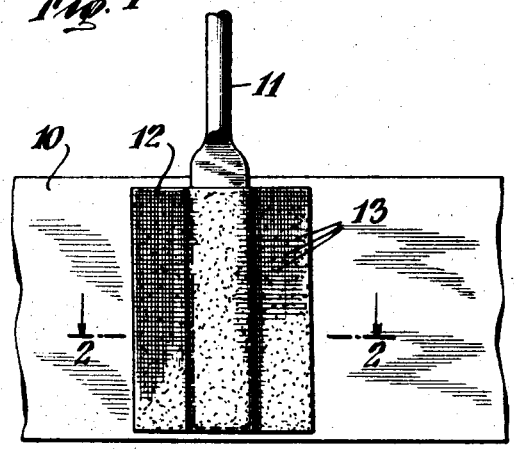
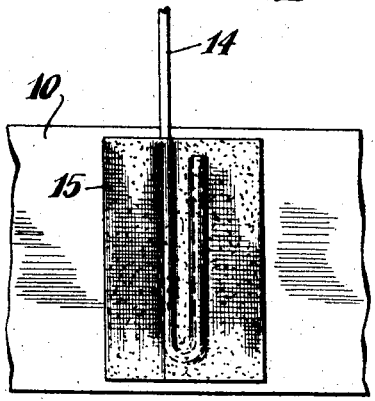
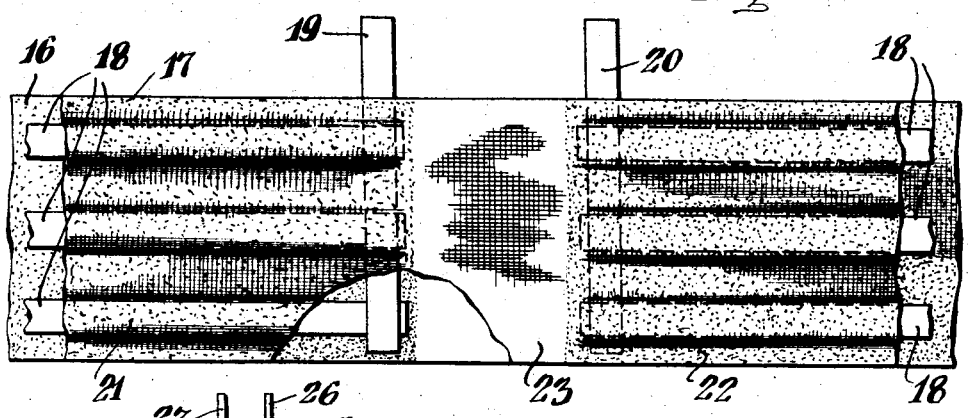
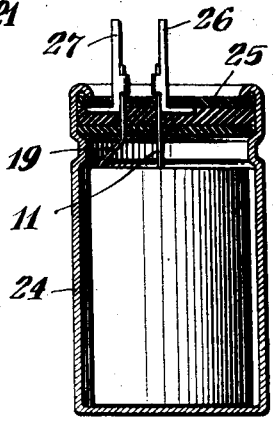
INVENTOR
Charles Marvin Blackburn
BY
ATTORNEY Patented Sept. 12, 1939

2,172,604

UNITED STATES PATENT OFFICE 2,172,604

ELECTROLYTIC CONDENSER TERMINAL

Charles Marvin Blackburn, Jackson, Ind., assignor to P. R. Mallory & Co., Inc., Indianapolis, Ind., a corporation of Delaware Application November 1, 1937, Serial No. 172,096

5 Claims. (Cl. 175—315)

This invention relates to electrolytic condensers and terminals therefor.

An object of the invention is to improve the terminal arrangement for electrolytic condensers.

Other objects of the invention will be apparent from the following description and accompanying drawing taken in connection with the appended claims.

The invention comprises the features of construction, combination of elements, arrangement of parts, and methods of manufacture and operation referred to above or which will be brought out and exemplified in the disclosure hereinafter set forth, including the illustrations in the drawing.

In the drawing:

Figure 1 is a view of a portion of an electrode for a dry electrolytic condenser having terminals affixed thereto according to my invention;

Figure 2 is a section on the line 2—2 of Figure 1;

Figures 3 and 4 show modified electrode-terminal assemblies; and

Figure 5 shows a completed condenser according to the invention.

According to one aspect of my invention a terminal is affixed to a condenser electrode by a metal spray process. For instance, an aluminum terminal strip may be placed in suitable relation to the electrode sheet, a gauze or other spray pervious layer placed so as to overlap it and the assembly, may be sprayed with aluminum by the Schoop process.

While a preferred embodiment of the invention is described herein, it is contemplated that considerable variation may be made in the method of procedure and the illustration of parts without departing from the spirit of the invention. In the following description and in the claims, parts will be identified by specific names for convenience, but they are intended to be as generic in their application to similar parts as the art will permit.

Referring to the drawing, Figure 1 shows an electrode sheet 10 suitable for use as an electrode in electrolytic condensers, particularly of the so-called "dry" type. Sheet 10 may, for instance, comprise an aluminum foil or it may comprise a sheet of paper or other material upon which a layer of aluminum has been sprayed.

Terminal 11, connected to electrode 10, comprises a wire, preferably of the same composition, for instance aluminum, which has been flattened at one end. The flattened end is preferably also roughened somewhat by etching, sand blasting, scratch brushing, embossing or other methods.

The terminal 11 is affixed to electrode 10, so as to be electrically and mechanically connected thereto, as follows: Terminal 11 is laid against the face of electrode 10, in the position shown. A square of gauze 12 is placed over the flattened portion of terminal 11 so as to overlap its edges. The assembly is then sprayed with metal, such as aluminum, by use of a metal spray gun or Schoop gun whereby the sprayed metal 13 penetrates through the gauze and adheres to the surface of terminal 11 and of the electrode 12 thereby providing an intimate bond to both the electrode and the terminal and a continuous metallic conductive path therebetween which will not be broken by electrolytic film-formation of the metal surfaces or by ordinary handling and flexing.

The gauze 12 should preferably be of somewhat open mesh to allow penetration of the sprayed metal so that the resulting structure will appear somewhat as shown in Figure 2. A suitable material is open-mesh cotton gauze or cheesecloth. However, other materials having similar open mesh or porous nature may be satisfactorily used such as porous sheet materials, felt, wire, gauze, perforated paper and the like.

If electrode 10 is of a smooth material, it may also be found desirable to roughen its surface in a manner similar to that of roughening the terminal.

The electrode 10 can be cut into suitable length for winding into a dry electrolytic condenser assembly in which case terminal 11 may be located either at one end or at an intermediate position on the electrode.

Figure 3 shows a modified terminal arrangement wherein a looped wire 14 is laid against electrode 10, covered with a gauze patch 15 and the assembly sprayed as already described.

Figure 4 shows another modification wherein the electrodes themselves are fabricated at the same time as the terminals are affixed. The assembly of this figure comprises a pair of cloth gauze layers 16 and 17 between which parallel strips of thin aluminum or other metal foil 18 are sandwiched. Terminal tabs 19 and 20, comprising narrow strips of heavy foil (preferably aluminum) are also sandwiched between layers 16 and 17, these tabs being laid across foil strips 18 and one end of the tabs extending beyond the edge of the gauze.

The whole assembly is sprayed with a film-forming metal, preferably aluminum, on both sides whereby all the parts are integrally bonded together to form an electrode-terminal assembly.

In multi-electrode production the foil strips 18 may be broken at intervals, as shown to leave a section 23 consisting only of the two gauze layers and during spraying this section may be covered by a mask or the spray guns temporarily stopped so as to leave this section unsprayed. Thus a plurality of electrodes, such as 21 and 22, can be formed which are serially connected together by the gauze but which are conductively isolated. These sections can then be cut apart if desired or used in connected groups of two or more in multi-electrode condensers.

Figure 5 shows a completed condenser comprising two electrodes of the type described, for instance electrodes 10 and 21, rolled together with interleaved condenser separators and impregnated with a suitable film-maintaining electrolyte the assembly being inserted in a can 24 having a top 25 through which the terminals, for instance, terminals 11 and 19 extend, the terminals being secured to suitable attaching lugs 26 and 27 at the top of the condenser.

While the present invention, as to its objects and advantages, has been described herein as carried out in specific embodiments thereof, it is not desired to be limited thereby but it is intended to cover the invention broadly within the spirit and scope of the appended claims.

What is claimed is:

1. An electrolytic condenser electrode-terminal assembly comprising an electrode of film-forming metal, a conductive terminal disposed against the surface thereof, a layer of perforated material overlapping both said terminal and said electrode and a cohering metal deposit held in said layer and adhering to said terminal and to said electrode.

2. An electrolytic condenser electrode-terminal assembly comprising an electrode of film-forming metal, a conductive terminal disposed against the surface thereof, a layer of gauze overlying both said terminal and said electrode and a spray-deposit of metal on said gauze and bonded to said terminal and to said electrode.

3. A dry electrolytic condenser electrode-terminal assembly comprising an electrode sheet of film-forming metal, a metal terminal strip laid across said sheet, a layer of gauze overlapping said terminal strip and said electrode sheet and a coherent spray-deposit of metal on said gauze and bonded to said terminal and said electrode sheet to connect them together mechanically and electrically.

4. A dry electrolytic condenser electrode-terminal assembly comprising an electrode formed of two layers of cloth having a spray-deposit of film-forming metal thereon and a terminal tab sandwiched between said cloth layers and extending beyond an edge thereof, said spray-deposit bonding said cloth layers and said terminal tab together in a unitary assembly.

5. A dry electrolytic condenser comprising a container, and an assembly therein comprising a pair of electrodes, spacers separating said electrodes, a film-maintaining electrolyte held in said spacers, and terminals secured to said electrodes, at least one of the electrode-terminal assemblies comprising an electrode of film-forming metal, a conductive terminal disposed against the surface thereof, a layer of perforate material overlying both said terminal and said electrode and a cohering metal deposit held in said layer and adhering to said terminal and to said electrode.

CHARLES MARVIN BLACKBURN.